(12) United States Patent
Komatsu et al.

(10) Patent No.: US 7,816,433 B2
(45) Date of Patent: Oct. 19, 2010

(54) POLYACETAL RESIN COMPOSITION AND ARTICLE THEREOF

(75) Inventors: Sumio Komatsu, Okayama (JP); Yukiyoshi Sasaki, Okayama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 887 days.

(21) Appl. No.: 10/575,488

(22) PCT Filed: Oct. 21, 2004

(86) PCT No.: PCT/JP2004/015580

§ 371 (c)(1), (2), (4) Date: Sep. 15, 2006

(87) PCT Pub. No.: WO2005/040275

PCT Pub. Date: May 6, 2005

(65) Prior Publication Data

US 2007/0078204 A1   Apr. 5, 2007

(30) Foreign Application Priority Data

Oct. 24, 2003 (JP) .............................. 2003-364175

(51) Int. Cl.
*C08K 5/25* (2006.01)
(52) U.S. Cl. ...................................... 524/192; 524/211
(58) Field of Classification Search ................. 524/211, 524/192
See application file for complete search history.

(56) References Cited

U.S. PATENT DOCUMENTS

| 5,212,222 | A | * | 5/1993 | Mitsuuchi et al. ............ 524/230 |
| 5,866,671 | A | | 2/1999 | Shinohara |
| 6,388,049 | B1 | | 5/2002 | Yokoyama et al. |
| 6,506,850 | B1 | | 1/2003 | Tanimura et al. |
| 6,673,405 | B2 | | 1/2004 | Harashina |
| 2005/0018353 | A1 | | 1/2005 | Tsukahara |

FOREIGN PATENT DOCUMENTS

| EP | 0235927 | | 9/1987 |
| JP | 51-111857 | | 10/1976 |
| JP | 4-345648 | | 12/1992 |
| JP | 8-041288 | | 2/1996 |
| JP | 10-036630 | | 2/1998 |
| JP | 10-298401 | | 11/1998 |
| JP | 10298401 | | 11/1998 |
| JP | 11-335519 | | 12/1999 |
| JP | 2000-159850 | | 6/2000 |
| JP | 2000-239484 | | 9/2000 |
| JP | 2002-212384 | | 7/2002 |
| WO | 95/16734 | | 6/1995 |
| WO | 00/59993 | | 10/2000 |
| WO | WO 01/51561 | * | 7/2001 |
| WO | 03/050186 | | 12/2001 |

OTHER PUBLICATIONS

Machine translation of JP 2000-159850.*
English Language Abstract of JP 2000-159850.
English Language Abstract of JP 10-298401.
English Language Abstract of JP 10-036630.
English Language Abstract of JP 4-345648.
English Language Abstract of JP 11-335519.
English Language Abstract of JP 51-111857.
English Language Abstract of JP 2000-239484.
English Language Abstract of JP 2002-212384.
English Language abstract JP 10298401.

* cited by examiner

*Primary Examiner*—Milton I Cano
*Assistant Examiner*—John Uselding
(74) *Attorney, Agent, or Firm*—Greenblum & Bernstein, P.L.C.

(57) ABSTRACT

A polyacetal resin composition comprising (A) 100 parts by mass of polyacetal resin generating formaldehyde in an amount of not more than 100 ppm when heated at a temperature of 200° C. for 50 minutes under the nitrogen atmosphere and (B) 0.01 to 5 parts by mass of a hydrazide compound can provide an article which is remarkably reduced in an emission amount of formaldehyde even though molded either at a higher temperature or under molding conditions wherein the resin temperature rises partially. Therefore, the polyacetal resin composition can be molded according to various molding methods and under a wide range of molding conditions. The article molded from the resin composition has succeeded in reducing the emission amount of formaldehyde, measured according to VDA275 method, to not more than 1 mg/kg, the level never achieved before, and therefore is usable for various applications where a reduced VOC is required.

12 Claims, No Drawings

POLYACETAL RESIN COMPOSITION AND ARTICLE THEREOF

This application is a 371 of PCT/JP04/15580 filed Oct. 21, 2004 which claims priority to JP 2003-364175 filed Oct. 24, 2003.

TECHNICAL FIELD

The present invention relates to a polyacetal resin composition which provides an article, which is remarkably reduced in an emission amount of formaldehyde. Particularly, the present invention relates to a polyacetal resin composition which is moldable by a variety of molding methods and under a wide range of conditions (molding temperature, etc.) and has good thermal aging resistance.

BACKGROUND ART

Polyacetal resins have been used in various applications such as electric equipment and parts thereof, automobile parts and other mechanical parts, because they are excellent in balance of mechanical strength, chemical resistance and slidability and also in workability.

Recently, a demand for a polyacetal resin article being compact, thin-walled or precise has been increasing. As a result, molding methods or conditions wherein higher thermal history is applied are more often employed for molding. For example, molding using a pin-gate type mold, high-cycle molding, or a molding method for a compact, thin-walled or precise part using a polyacetal resin having higher viscosity can be enumerated. In these methods, higher thermal history is given to a resin compared to usual molding methods by raising a shear rate or by increasing screw rotation speed or molding temperature for reducing a plasticizing time. Even when a usual molding method is employed, higher thermal history is caused. This is because a molding temperature is often increased to avoid molding defects such as flow mark, weldline, and jetting. Moreover, in the case in which a hot-runner type mold is used, resin decomposition may occur owing to increase of a resin temperature caused by partial accumulation of resin.

As the resin temperature goes up in a molding machine, polyacetal resin becomes more vulnerable to heat decomposition, self oxidation decomposition, decomposition by acid or base, decomposition by residual active catalyst or the like, and more formaldehyde is disadvantageously generated owing to the decomposition. The conventional polyacetal resins are not suitable for the molding method wherein higher thermal history is applied.

In the field of automobile interior parts, it has been increasingly demanded to reduce an emission amount of volatile organic compounds (VOC) such as formaldehyde. As described above, polyacetal resin has the feature of generating formaldehyde by decomposition of main chain. However, proposals satisfying the above demand have not yet been made.

Various methods have been suggested to reduce an amount of formaldehyde emitted from an article of a polyacetal resin. For example, there have been suggested to add a polyamide and a hydrazine derivative (Patent Document 1); to add a hydrazide compound (Patent Document 2); to add a nitrogen compound selected from a melamine, a melamine derivative and di-carboxylic acid di-hydrazide (Patent Document 3); to add a benzoguanamine (Patent Document 4); to attach a partial aliphatic acid ester of a polyhydric alcohol to the surface of pellet (Patent Document 5); to add a mono N-substituted urea (Patent Document 6); to add a compound including carboxyl group having acid dissociation index of not smaller than 3.6 (Patent Document 7); to add a condensate of phenols, a compound including basic nitrogen and aldehydes (Patent Document 8); to add hydantoin derivatives or imidazole derivatives (Patent Document 9); to add a low molecular weight amino compound having a basic dissociation index of 2 to 8 (Patent Document 10); to add a spiro compound having cyclic triazine (Patent Document 11); and the like.

Patent Document 1: JP-A-51-111857
Patent Document 2: JP-A-4-345648
Patent Document 3: U.S. Pat. No. 5,212,222 (JP-A-7-173369)
Patent Document 4: EP 235 927 A2 (JP-A-62-190248)
Patent Document 5: WO95/16734 (JP-A-6-107900)
Patent Document 6: JP-A-11-335519
Patent Document 7: JP-A-2000-239484
Patent Document 8: JP-A-2002-212384
Patent Document 9: U.S. Pat. No. 5,866,671 (JP-A-8-41288)
Patent Document 10: WO00/59993
Patent Document 11: U.S. Pat. No. 6,673,405

The present inventors have found that among these suggested compounds, a hydrazide compound is most effective to reduce an amount of formaldehyde emitted from an article. According to Patent Document 2, however, the hydrazide compound is not effective to inhibit generation of formaldehyde caused by decomposition of a polyacetal resin in molten state. Therefore, the hydrazide compound is not suitable for molding as described above or molding causing partial rising of resin temperature. Moreover, according to Patent Document 9, the use of a hydrazide compound might be limited depending on application. That is, a hydrazine might be generated by hydrolysis of a hydrazide compound or the like under a certain condition so that the use of the hydrazide compound is sometimes limited depending on with which additives the compound is combined. Furthermore, addition of the hydrazide compound in a large quantity might cause mold deposit during molding or bleed-out to the surface of articles. As described above, the hydrazide compound has the problem that the use thereof is limited, though superior in inhibition of formaldehyde generation.

DISCLOSURE OF THE INVENTION

Problem to be Solved by the Invention

An object of the present invention is to provide a polyacetal resin composition which can produce an article remarkably reduced in the amount of formaldehyde emitted. Another object of the present invention is to provide a polyacetal resin composition moldable by a variety of molding methods and under a wide range of conditions (molding temperature, etc.). Further, another object of the present invention is to provide an article being excellent in thermal stability and restrained in emission of formaldehyde.

Means to Solve the Problem

As a result of extensive studies to attain the aforementioned objects, the present inventors have found that a polyacetal resin composition comprising (A) a specific polyacetal resin and (B) a hydrazide compound can attain the objects, and have accomplished the present invention.

The present invention provides:

1. A polyacetal resin composition comprising:
   (A) 100 parts by mass of a polyacetal resin generating formaldehyde in an amount of not more than 100 ppm when heated at a temperature of 200° C. for 50 minutes under a nitrogen atmosphere, and
   (B) 0.01 to 5 parts by mass of a hydrazide compound;

2. The polyacetal resin composition according to item 1 above, wherein the polyacetal resin (A) is a polyacetal copolymer obtainable through the heat treatment of unstable terminal groups as defined by the following;

<Heat Treatment of Unstable Terminal Groups>
the polyacetal copolymer is subjected to heat treatment in a molten state at a temperature in the range of from the melting point of the polyacetal copolymer to 260° C. in the presence of at least one quaternary ammonium compound represented by the formula (1) below:

$$[R^1R^2R^3R^4N^+]_n X^{-n} \tag{1}$$

wherein each of $R^1$, $R^2$, $R^3$ and $R^4$ independently represents an unsubstituted or substituted $C_1$-$C_{30}$ alkyl group, a $C_6$-$C_{20}$ aryl group, an aralkyl group wherein an unsubstituted or substituted $C_1$-$C_{30}$ alkyl group is substituted with at least one $C_6$-$C_{20}$ aryl group, or an alkylaryl group wherein a $C_6$-$C_{20}$ aryl group is substituted with at least one unsubstituted or substituted $C_1$-$C_{30}$ alkyl group, wherein the unsubstituted or substituted alkyl group being linear, branched, or cyclic, and the substituted alkyl group having at least one substituent selected from the group consisting of a halogen atom, a hydroxyl group, an aldehyde group, a carboxyl group, an amino group, and an amide group, and wherein at least one hydrogen atom of each of the unsubstituted alkyl group, the aryl group, the aralkyl group, and the alkylaryl group being optionally replaced by a halogen atom; n represents an integer of from 1 to 3; and X represents a hydroxyl group, an acid residue of a $C_1$-$C_{20}$ carboxylic acid, a hydroacid excluding a hydrogen halide, an oxoacid, an inorganic thioacid, or a $C_1$-$C_{20}$ organic thioacid; in an amount of from 0.05 to 50 ppm by mass in terms of the amount of the nitrogen ascribed to the quaternary ammonium compound, based on the total mass of the polyacetal copolymer and the quaternary ammonium compound, wherein the amount of the nitrogen is represented by the formula (2) below:

$$P \times 14/Q \tag{2}$$

wherein P represents the amount (ppm by mass) of the quaternary ammonium compound, based on the total mass of the polyacetal copolymer and the quaternary ammonium compound, 14 is the atomic weight of nitrogen, and Q represents the molecular weight of the quaternary ammonium compound.

3. The polyacetal resin composition according to item 1 or 2 above, wherein the polyacetal resin has a melting point of 155 to 171° C.;

4. The polyacetal resin composition according to any of items 1 to 3 above, wherein the polyacetal resin is a polyacetal copolymer polymerized using a complex compound of boron trifluoride and having a concentration of residual fluorine of not more than 13 ppm;

5. The polyacetal resin composition according to any of items 1 to 4 above, wherein the hydrazide compound is represented by the following formula (3):

$$H_2NNHCO-R^5-CONHNH_2 \tag{3}$$

wherein $R^5$ represents a $C_2$-$C_{20}$ hydrocarbon;

6. The polyacetal resin composition according to any of items 1 to 5 above, wherein the hydrazide compound has a melting point of not lower than 160° C.;

7. The polyacetal resin composition according to any of items 1 to 6 above, wherein the hydrazide compound (B) is a sebacic di-hydrazide;

8. The polyacetal resin composition according to any of items 1 to 7 above, which further comprises, based on 100 parts by mass of polyacetal resin,
   (C) 0.1 to 10 parts by mass of at least one selected from the group consisting of an antioxidant, a polymer or a compound containing formaldehyde reactive nitrogen, a catching agent of formic acid, a weathering (light) stabilizer, and a mold release agent (a lubricant);
   (D) 0 to 60 parts by mass of at least one selected from the group consisting of a reinforcing material, an electrically conductive material, a thermoplastic resin, and a thermoplastic elastomer; and
   (E) 0 to 5 parts by mass of a pigment;

9. The polyacetal resin composition according to any of items 1 to 8 above, which provides an article obtained by molding at a temperature of 200° C. having an emission amount of formaldehyde, measured according to VDA275 method, of not more than 1 mg/kg;

10. The polyacetal resin composition according to any of items 1 to 8 above, which provides an article obtained by molding at a temperature of 240° C. having an emission amount of formaldehyde, measured according to VDA275 method, of not more than 3 mg/kg; and 11. An article obtainable by molding the polyacetal resin composition according to any of items 1 to 8 above, wherein an emission amount of formaldehyde, measured according to VDA275 method, is not more than 1 mg/kg.

EFFECT OF THE INVENTION

The polyacetal resin (A) of the present invention generates formaldehyde in an amount of not more than 100 ppm when heated at a temperature of 200° C. for 50 minutes under a nitrogen atmosphere. Since such a polyacetal resin generates a reduced amount of formaldehyde when molded, the amount of hydrazide compound to be added can be decreased. Therefore, there is no concern about generation of a hydrazine caused by degradation of hydrazide compound and occurrence of mold-deposit or bleed-out. The amount of formaldehyde emitted from an article obtained by molding under a usual condition is reduced to such a level that has not been achieved before. Surprisingly, an emission amount of formaldehyde can be restrained even when molding is conducted at a higher temperature than usual.

Especially, when a polyacetal resin, of which unstable terminal groups are removed by using a quaternary ammonium compound, is employed, the above-mentioned effects can be enhanced. That is, there is no concern about hydrolysis of a hydrazine because there is no need to use a volatile basic compound such as triethylamine, which has been used for stabilization of polymer-terminal, and a smaller amount of a quaternary ammonium compound to be added is sufficient enough. Further, because a quaternary ammonium compound is effective in deactivating residual active catalysts, there is no need for concern about degradation of polymer upon molding.

BEST MODE FOR CARRYING OUT THE INVENTION

Hereinafter, the present invention is described in detail.
Representative examples of the polyacetal resin of the present invention include a polyacetal homopolymer obtained by polymerizing a monomer of formaldehyde or its cyclic oligomer such as trimer (trioxane), tetramer (tetraoxane), etc.; and a polyacetal copolymer obtained by copolymerizing a monomer of formaldehyde or its cyclic oligomer such as trimer (trioxane), tetramer (tetraoxane), etc. with cyclic ether or cyclic formal such as ethylene oxide, propylene oxide, epichlorohydrin, 1,3-dioxolane, cyclic formal of glycol or di-glycol (1,4-butanediol formal, etc.). A branched polyacetal copolymer obtained by copolymerizing with monofunctional glycidyl ether and a crosslinked polyacetal copolymer obtained by copolymerizing with multifunctional glycidyl ether can be also included. Moreover, a polyacetal block polymer obtained by polymerizing a monomer of formaldehyde or its cyclic oligomer in the presence of a compound having functional groups such as hydroxide at either or both terminals, for example, polyalkylene glycol, and a polyacetal block copolymer obtained by copolymerizing a monomer of formaldehyde or its cyclic oligomer such as trimer (trioxane), tetramer (tetraoxane), etc. with cyclic ether or cyclic formal thereof in the presence of a compound having functional groups such as hydroxide at either or both terminals, for example, hydrogenated polybutadiene glycol can be also included. In the present invention, both a homopolymer and a copolymer are usable. Preferred is a copolymer.

An amount of the comonomer such as 1,3-dioxolane is 0.1 to 60 mol %, preferably 0.1 to 20 mol %, more preferably 0.15 to 10 mol %, based on 1 mol of trioxane. In the present invention, a polyacetal copolymer having a melting point of 155 to 171° C., preferably 162 to 171° C. is particularly preferred. This copolymer can be obtained by using about 1.3 to 5 mol % of the comonomer based on 1 mol of trioxane.

As a catalyst for polymerizing a polyacetal resin, well-known catalysts can be used. Of these, cationic active catalysts such as Lewis acid, protonic acid, and their esters or anhydrides are preferable. The Lewis acid includes, for example, halides of boric acid, tin, titanium, phosphorus, arsenic, and antimony: specifically, boron trifluoride, tin tetrachloride, titanium tetrachloride, phosphorus pentafluoride, phosphorus pentachloride, antimony pentafluoride, and their complex compounds or salts. Specific examples of the protonic acids and their esters or anhydrides include perchloric acid, trifluoromethanesulfonic acid, t-butyl perchlorate, acetyl perchlorate, trimethyloxonium hexafluorophosphate, etc. Among them, boron trifluoride, boron trifluoride hydrate, and coordination complex compounds of oxygen atom or sulfur atom-containing organic compounds with boron trifluoride are preferable. Typically diethyl ether of boron trifluoride and di-n-butyl ether of boron trifluoride are enumerated.

In the present invention, a polyacetal copolymer having a concentration of residual fluorine of not more than 13 ppm, preferably not more than 8 ppm, is preferable. Such a copolymer can be obtained by controlling a concentration of catalyst during polymerization not to exceed a certain concentration. Specifically, a concentration of catalyst of not more than $3.0 \times 10^{-5}$ mol based on 1 mol of trioxane is preferable. Particularly, in order to obtain a polyacetal copolymer having a concentration of residual fluorine of not more than 8 ppm, the catalyst concentration is preferably controlled not to exceed $1.5 \times 10^{-5}$ mol based on 1 mol of trioxane. In the case that a concentration of residual fluorine becomes less than 13 ppm owing to a higher concentration of catalyst during polymerization, the concentration of residual fluorine in the polyacetal copolymer can be reduced to not more than 13 ppm by washing with a solvent. Specifically, the concentration of residual fluorine can be reduced according to the method comprising washing a polyacetal copolymer obtained at the time when a residual catalyst is deactivated after polymerization or a polyacetal copolymer with stabilized terminal groups, which is obtained by decomposing unstable terminal groups of the polyacetal copolymer at the time when a polymerization catalyst is deactivated, with hot water, water vapor, or a mixed solvent of water and organic solvent at a high temperature. For example, the concentration of residual fluorine can be controlled not to exceed 13 ppm by washing a polyacetal copolymer after being subjected to stabilization of terminal groups thereof with a solution including 15% of methanol at a temperature of 80 to 150° C. for 10 minutes to a few hours. The washing condition is determined according to the concentration of fluoride in the pre-washed polymer.

A bulk polymerization process is generally employed for the polymerization, and it can be carried out either batchwise or continuously. As an apparatus for polymerization, a co-kneader, twin-screw successive extruder, or self-cleaning type extruder such as twin-paddle successive extruder can be employed. In the polymerization process, monomer components in a molten state are fed to a polymerization apparatus to produce a polymer in the form of solid mass as the polymerization progresses.

A polyacetal copolymer obtained according to the above-mentioned polymerization has thermally unstable terminal groups ($-(OCH_2)_n-OH$ groups) and thus the polyacetal copolymer itself does not satisfy the requirement of the present invention that the amount of formaldehyde generated upon heating at a temperature of 200° C. for 50 minutes under the nitrogen atmosphere is not more than 100 ppm. Accordingly, treatment for decomposing and removing such unstable terminal groups is required. On this occasion, the important point is that in the present invention a polyacetal resin which generates formaldehyde in an amount of not more than 100 ppm, preferably not more than 90 ppm, more preferably not more than 70 ppm upon heating at the temperature of 200° C. for 50 minutes under the nitrogen atmosphere is used. Using such a polyacetal resin, there can be obtained an article which is remarkably restrained in the emission amount of formaldehyde and a polyacetal resin composition having an excellent thermal aging resistance. The polyacetal resin generating formaldehyde in an amount of not more than 100 ppm upon heating at a temperature of 200° C. for 50 minutes under the nitrogen atmosphere can be obtained through the specific heat treatment of unstable terminal groups described below. The specific heat treatment of unstable terminal groups comprises subjecting the polyacetal resin in a molten state to heat treatment at a temperature ranging from the melting point of the polyacetal resin to 260° C. in the presence of at least one quaternary ammonium compound represented by the formula (1) below:

$$[R^1R^2R^3R^4N^+]_nX^{-n} \qquad (1)$$

wherein each of $R^1$, $R^2$, $R^3$ and $R^4$ independently represents an unsubstituted or substituted $C_1$-$C_{30}$ alkyl group, a $C_6$-$C_{20}$ aryl group, an aralkyl group wherein an unsubstituted or substituted $C_1$-$C_{30}$ alkyl group is substituted with at least one $C_6$-$C_{20}$ aryl group, or an alkylaryl group wherein a $C_6$-$C_{20}$ aryl group is substituted with at least one unsubstituted or substituted $C_1$-$C_{30}$ alkyl group, wherein the unsubstituted or substituted alkyl group is linear, branched, or cyclic, and the substituted alkyl group has at least one substituent selected from the group consisting of a halogen atom, a hydroxyl group, an aldehyde group, a carboxyl group, an amino group, and an amide group, and wherein at least one hydrogen atom of each of the unsubstituted alkyl group, the aryl group, the aralkyl group, and the alkylaryl group is optionally replaced by a halogen atom; n represents an integer of from 1 to 3; and X represents a hydroxyl group, an acid residue of a $C_1$-$C_{20}$ carboxylic acid, a hydroacid excluding a hydrogen halide, an oxoacid, an inorganic thioacid, or a $C_1$-$C_{20}$ organic thioacid.

Among them, each of $R^1$, $R^2$, $R^3$ and $R^4$ in the formula (1) is independently preferably a $C_1$-$C_5$ alkyl group or a $C_2$-$C_4$ hydroxyalkyl group, more preferably at least one of $R^1$, $R^2$, $R^3$ and $R^4$ is a hydroxyethyl group. Specifically, there can be exemplified hydroxide of such as tetramethyl ammonium, tetraethyl ammonium, tetrapropyl ammonium, tetra-n-butyl ammonium, cetyl trimethyl ammonium, tetradecyl trimethyl ammonium, 1,6-hexamethylene bis(trimethylammonium), decamethylene-bis-(trimethylammonium), trimethyl-3-chloro-2-hydroxypropyl ammonium, trimethyl(2-hydroxyethyl)ammonium, triethyl(2-hydroxyethyl)ammonium, tripropyl(2-hydroxyethyl)ammonium, tri-n-butyl(2-hydroxyethyl)ammonium, trimethyl benzyl ammonium, triethyl benzyl ammonium, tripropyl benzyl ammonium, tri-n-butylbenzyl ammonium, trimethyl phenyl ammonium, triethyl phenyl ammonium, trimethyl-2-oxyethyl ammonium, monomethyl trihydroxyethyl ammonium, monoethyl trihydroxyethyl ammonium, octadecyl tri(2-hydroxyethyl) ammonium, and tetrakis(hydroxyethyl)ammonium; hydroacid salt such as hydrochloric acid, bromic acid, and fluoric acid; oxoacid salt such as sulfuric acid, nitric acid, phosphoric acid, carbonic acid, boric acid, chloric acid, iodic acid, silicic acid, perchloric acid, chlorous acid, hypochlorous acid, chlorosulfuric acid, amid sulfuric acid, disulfuric acid, and tripolyphosphoric acid; thioacid salt such as thiosulfuric acid; carboxylic acid salt such as formic acid, acetic acid, propionic acid, butyric acid, isobutyric acid, pentanoic acid, caproic acid, caprylic acid, capric acid, benzoic acid, and oxalic acid; and the like. Of these, hydroxide ($OH^-$) and salts of sulfuric acid ($HSO_4^-$ and $SO_4^{2-}$), carbonic acid ($HCO_3^-$ and $CO_3^{2-}$), boric acid ($B(OH)_4^-$), and carboxylic acid are preferable. Among the carboxylic acids, a formic acid, an acetic acid, and a propionic acid are particularly preferable. These quaternary ammonium compounds may be used alone or in combination.

An amount of the quaternary ammonium to be added is preferably 0.05 to 50 ppm by mass in terms of the amount of nitrogen derived from the quaternary ammonium compound represented by the formula (2) below, based on the total mass of the polyacetal resin and the quaternary ammonium:

$$P \times 14/Q \qquad (2)$$

wherein P represents the amount (ppm) of the quaternary ammonium compound, based on the total mass of the polyacetal resin and the quaternary ammonium compound, numeral 14 is the atomic weight of nitrogen, and Q represents the molecular weight of the quaternary ammonium compound.

When the addition amount of the quaternary ammonium compound is less than 0.05 ppm by mass, the decomposing rate of unstable terminal groups is decreased. When it is more than 50 ppm by mass, the color of the polyacetal resin is deteriorated after the unstable terminal groups decompose. A preferable heat treatment is carried out at a resinous temperature of not lower than the melting point of the polyacetal resin and not higher than 260° C. using an extruder, a kneader, and the like. When the resinous temperature is higher than 260° C., there may cause problems in the coloring and the decomposition of the polymer main chain (decrease in a molecular weight). Formaldehyde generated during the decomposition is removed under a reduced pressure. A method for adding the quaternary ammonium compound is not particularly limited. There can be exemplified a method comprising adding the compound in an aqueous solution at the step for inactivating a polymerization catalyst, a method comprising blowing the compound to a resin powder, and the like. Any method is acceptable as long as the compound has been added at the heat treatment step of the resin. In the case that the compound is charged into an extruder or that a filler or a pigment is formulated using an extruder or the like, it may be possible to attach the compound to resinous pellets and then conduct the decomposition of the unstable terminal groups at the subsequent formulation step. The decomposition of the unstable terminal groups can be also conducted after a polymerization catalyst in a polyacetal resin obtained by polymerization is inactivated, and it can be conducted without inactivating the polymerization catalyst. As a method for inactivating the polymerization catalyst, a method wherein the polymerization catalyst is inactivated by neutralization in a basic aqueous solution such as amines, can be exemplified as a representative example. Further, without inactivating the polymerization catalyst, the polyacetal resin is heated at a temperature not higher than the melting point of the resin in an inert gas atmosphere to reduce the polymerization catalyst concentration by volatilization, and then the decomposition of the unstable terminal groups of the present invention may be carried out.

For the decomposition treatment of unstable terminal groups of the polyacetal resin, it has been known to use volatile basic compound such as triethylamine. However, triethylamine and the like may cause hydrolysis of a hydrazide compound, which is further added in the present invention. On the other hand, the above-mentioned method of decomposing the unstable terminal groups using a quaternary ammonium compound is preferred for the reason that a hydrazide compound is immune from hydrolysis because of no necessity to use triethylamine and the polyacetal resin is also immune from depolymerization because the quaternary ammonium compound can deactivate a residual active catalyst.

The hydrazide compound (B) of the present invention is described below.

The hydrazide compound used in the present invention is preferably a dicarboxylic acid di-hydrazide represented by the following formula (3):

$$H_2NNHCO—R^5—CONHNH_2 \qquad (3)$$

wherein $R^5$ represents a $C_2$-$C_{20}$ hydrocarbon.

Preferred are malonic acid di-hydrazide, succinic acid di-hydrazide, glutaric acid di-hydrazide, adipic acid di-hydrazide, pimelic acid di-hydrazide, suberic acid di-hydrazide, azelaic acid di-hydrazide, sebacic acid di-hydrazide, dodecanoic acid di-hydrazide, isophthalic acid di-hydrazide, phthalic acid di-hydrazide, naphthalene 2,6-di-carboxylic acid di-hydrazide, and the like. Among them, sebacic acid di-hydrazide, dodecanoic acid di-hydrazide, isophthalic acid di-hydrazide, and naphthalene 2,6-di-carboxylic acid di-hydrazide are preferred. Most preferred is sebacic acid di-hydrazide. The amount of a hydrazide compound to be added is 0.01 to 5 parts by mass, preferably 0.03 to 3 parts by mass, most preferably 0.05 to 1 part by mass, based on 100 parts by mass of a polyacetal resin. A hydrazide compound can be used either individually or in combination. The melting point of a hydrazide compound is preferably not lower than 160° C., more preferably not lower than 170° C.

To the polyacetal resin composition of the present invention, publicly known additives, thermal stabilizers, or the like may be added so long as the addition is not detrimental to the gist of the present invention. Specifically, there can be exemplified a polyacetal resin composition containing, based on 100 parts by mass of the polyacetal resin, (C) 0.1 to 10 parts by mass of at least one selected from the group consisting of an antioxidant, a polymer or a compound containing formaldehyde reactive nitrogen, a catching agent of formic acid, a weathering (light) stabilizer, and a mold release agent (a lubricant), (D) 0 to 60 parts by mass of at least one selected from the group consisting of a reinforcing material, an electrically conductive material, a thermoplastic resin, and a thermoplastic elastomer, and (E) 0 to 5 parts by mass of a pigment.

As the antioxidant, hindered phenol type antioxidants are preferable. Specifically, they include, for example, n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-[3-(3,5-di-t-butyl-4-hydroxyphenyl)-propionate], 1,4-butanediol-bis-[3-(3,5-di-t-butyl-4-hydroxyphenyl)-propionate], triethylene glycol-bis-[3-(3-t-butyl-5-methyl-4-hydroxyphenyl)-propionate], 2,2'-methylenebis-(4-methyl-t-butylphenol), tetrakis[methylene-3-(3',5'-di-t-butyl-4'-hydroxyphenyl)propionate]methane, 3,9-bis[2-{3-(3-t-butyl-4-hydroxy-5-methylphenyl)propionyloxy}-1,1-dimethylethyl]2,4,8,10-tetraoxaspiro(5,5)undecane, N,N'-bis-3-(3',5'-di-t-butyl-4'-hydroxyphenyl)propionylhexamethylene diamine, N,N'-tetramethylene-bis-3-(3'-methyl-5'-t-butyl-4'-hydroxyphenol)propionyl diamine, N,N'-bis-[3-(3,5-di-t-butyl-4-hydroxyphenol)propionyl]hydrazine, N-salicyloyl-N'-salicylidene hydrazine, 3-(N-salicyloyl)amino-1,2,4-triazol, N,N'-bis[2-{3-(3,5-di-t-butyl-4-hydroxyphenyl)propionyloxy}ethyl]oxyamide, and the like; preferably, triethylene glycol-bis-[3-(3-t-butyl-5-methyl-4-hydroxyphenyl)-propionate] and tetrakis[methylene-3-(3',5'-di-t-butyl-4'-hydroxyphenyl)propionate]methane. These antioxidants may be used alone or in combination. Further, the antioxidant is preferably formulated in an amount of 0.01 to 1 part by mass based on 100 parts by mass of the polyacetal resin.

Examples of the polymer or the compound containing formaldehyde reactive nitrogen include polyamide resins such as nylon 46, nylon 6, nylon 66, nylon 610, nylon 612, and nylon 12, and copolymers thereof such as nylon 6/66/610 and nylon 6/612. Further, there can be exemplified a copolymer comprising acrylamide and a derivative thereof, a copolymer comprising acrylamide, a derivative thereof and other vinyl monomers, and a compound containing a formaldehyde reactive nitrogen atom having an amino substituent. As examples of the copolymer comprising acrylamide, a derivative thereof and other vinyl monomers, poly-β-alanine copolymer obtained by polymerizing acrylamide, a derivative thereof and other vinyl monomers in the presence of metallic alcoholate can be exemplified. Moreover, as examples of the compound containing formaldehyde reactive nitrogen atom having an amino substituent, there can be exemplified triazine derivatives such as guanamine(2,4-diamino-sym-triazine), melamine(2,4,6-triamino-sym-triazine), N-butylmelamine, N-phenylmelamine, N,N-diphenylmelamine, N,N-diallylmelamine, N,N',N"-triphenylmelamine, N-methylolmelamine, N,N',N"-trimethylolmelamine, benzoguanamine(2,4-diamino-6-phenyl-sym-triazine), acetoguanamine(2,4-diamino-6-methyl-sym-triazine), 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, N,N,N',N'-tetracyanoethyl benzoguanamine, succinoguanamine, ethylene dimelamine, triguanamine, melamine cyanurate, ethylene dimelamine cyanurate, triguanamine cyanurate, ammeline, and acetoguanamine. These polymers or compounds containing formaldehyde reactive nitrogen may be used alone or in combination. Among the above polymers or compounds containing formaldehyde reactive nitrogen, a polyamide resin is preferable.

As the catching agents of formic acid, there can be exemplified the above amino-substituted triazine, a co-condensation product of the amino-substituted triazine and formaldehyde, for instance, a polycondensation product of melamine and formaldehyde, and the like. As other catching agents of formic acid, there can be exemplified a hydroxide, an inorganic acid salt, a carboxylic acid salt, or an alkoxide of an alkali metal or an alkali earth metal. For instance, they include hydroxide of sodium, potassium, magnesium, calcium, and barium, and carbonate, phosphate, silicate, borate, and carboxylate of the above metals, and a layered double hydroxide.

As the carboxylic acid, saturated or unsaturated aliphatic carboxylic acids having 10 to 36 carbon atoms are preferable, and these carboxylic acids may be substituted with hydroxyl groups. As the aliphatic carboxylic acids, a capric acid, an undecylic acid, a lauric acid, a tridecylic acid, a myristic acid, a pentadecylic acid, a palmitic acid, a heptadecylic acid, a stearic acid, a nanodecanoic acid, an arachic acid, a behenic acid, a lignoceric acid, a cerotic acid, a heptacosanoic acid, a montanoic acid, a melissic acid, a lacceric acid, an undecylenic acid, an oleic acid, an elaidic acid, a cetoleic acid, an erucic acid, a brassidic acid, a sorbic acid, a linoleic acid, a linolenic acid, an arachidonic acid, a propiolic acid, a stearolic acid, a 12-hydroxydodecanoic acid, a 3-hydroxydecanoic acid, a 16-hydroxyhexadecanoic acid, a 10-hydroxyhexadecanoic acid, a 12-hydroxyoctadecanoic acid, a 10-hydroxy-8-octadecanoic acid, a dl-erythro-9,10-dihydroxyoctadecanoic acid, and the like. Among them, a dialiphatic calcium derived from a $C_{12}$-$C_{22}$ aliphatic acid is preferable. Specific examples include calcium dimyristate, calcium dipalmitate, calcium diheptadecylate, calcium distearate, calcium(myristate-palmitate), calcium(myristate-stearate), calcium(palmitate-stearate), and the like. And, particularly preferred is calcium dipalmitate, calcium diheptadecylate, and calcium distearate.

As the layered double hydroxide, hydrotalcites represented by the following formula can be included.

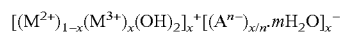

where $M^{2+}$ is a divalent metal, $M^{3+}$ is a trivalent metal, $A^{n-}$ is an anion with a valency of n (n is an integer of 1 or more), x is in a range of $0<x\leq0.33$, and m is a positive number. $M^{2+}$ includes, for example, $Mg_{2+}$, $Mn^{2+}$, $Fe^{2+}$, $Co^{2+}$, $Ni^{2+}$, $Cu^{2+}$, $Zn^{2+}$, ect.; $M^{3+}$ includes, for example, $Al^{3+}$, $Fe^{3+}$, $Cr^{3+}$, $Co^{3+}$, $In^{3+}$, etc; $A^{n-}$ includes, for example, $OH^-$, $F^-$, $Cl^-$, $Br^-$, $NO_3^-$, $Co_3^{2-}$, $SO_4^{2-}$, $Fe(CN)_6^{3-}$, $CH_3COO^-$, oxalate ion, salicylate ion, etc., particularly preferably $CO_3^{2-}$ and $OH^-$. Specific examples include natural hydrotalcite shown by $Mg_{0.75}Al_{0.25}(OH)_2(CO_3)_{0.125}\cdot0.5H_2O$ and synthetic hydrotalcite shown by $Mg_{4.5}Al_2(OH)_{13}CO_3\cdot3.5H_2O$, $Mg_{4.3}Al_2(OH)_{12.6}CO_3$, etc.

The weathering (light) stabilizers are preferably one or more than one selected from the group consisting of benzotriazole type substances, anilide oxalate type substances, and hindered amine type substances.

Examples of the benzotriazole type substances include 2-(2'-hydroxy-5'-methyl-phenyl)benzotriazole, 2-(2'-hydroxy-3,5-di-t-butyl-phenyl)benzotriazole, 2-[2'-hydroxy-3,5-bis(α,α-dimethylbenzyl)phenyl]benzotriazole, 2-(2'-hydroxy-3,5-di-t-amylphenyl)benzotriazole, 2-(2'-hydroxy-3, 5-di-isoamyl-phenyl)benzotriazole, 2-[2'-hydroxy-3,5-bis-(α,α-dimethylbenzyl)phenyl]-2H-benzotriazole, 2-(2'-hydroxy-4'-octoxyphenyl)benzotriazole, and the like. Examples of the anilide oxalate type substances include 2-ethoxy-2'-ethyloxalic acid bisanilide, 2-ethoxy-5-t-butyl-2'-ethyloxalic acid bisanilide, 2-ethoxy-3'-dodecyloxalic acid bisanilide, and the like. These substances may be used alone or in combination.

Examples of the hindered amine type substances include 4-acetoxy-2,2,6,6-tetramethylpiperidine, 4-stearoyloxy-2,2, 6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2, 6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-teteramethyl-4-piperidyl)carbonate, bis(2,2,6,6-tetramethyl-4-piperidyl)oxalate, bis(2,2,6,6-tetramethyl-4-piperidyl)-malonate, bis(1,2,2,6,6-pentamethyl-4-piperidinyl)sebacate, bis-(N-methyl-2,2,6,6-tetramethyl-4-piperidinyl)sebacate, bis(2,2,6,6-teteramethyl-4-piperidyl)sebacate, bis(2,2,6,6-teteramethyl-4-piperidyl)adipate, bis(2,2,6,6-teteramethyl-4-piperidyl)-terephthalate, 1,2-bis(2,2,6,6-teteramethyl-4-piperidyloxy)-ethane, α,α'-bis(2,2,6,6-teteramethyl-4-piperidyloxy)-p-xylene, bis(2,2,6,6-teteramethyl-4-piperidyl)tolylene-2,4-dicarbamate, bis(2,2,6,6-teteramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3, 4-tricarboxylate, 1-[2-{3-(3,5-di-t-butyl-4-hydroxyphenyl) propionyloxy}butyl]-4-[3-(3,5-di-t-butyl-4-hydroxyphenyl) propionyloxy]2,2,6,6-tetramethylpiperidine, a condensate of 1,2,3,4-butane tetracarboxylic acid, 1,2,2,6,6-pentamethyl-4-piperidinol and β,β,β',β'-tetramethyl-3,9-[2,4,8,10-tetraoxaspiro(5,5) undecane]diethanol, and the like. The above hindered amine type substances may be used alone or in combination.

Among the above, preferable weathering agents are 2-[2'-hydroxy-3,5-bis(α,α-dimethylbenzyl)phenyl]benzotriazole, 2-(2'-hydroxy-3,5-di-t-butylphenyl)benzotriazole, 2-(2'-hydroxy-3,5-di-t-amylphenyl)benzotriazole, bis(1,2,2,6,6-pentamethyl-4-piperidinyl)sebacate, bis-(N-methyl-2,2,6,6-tetramethyl-4-piperidinyl)sebacate, bis(2,2,6,6-tetramethyl-4-piperidinyl)sebacate, and a condensate of 1,2,3,4-butane tetracarboxylic acid, 1,2,2,6,6-pentamethyl-4-piperidinol, and β,β,β',β'-tetramethyl-3,9-[2,4,8,10-tetraoxaspiro(5,5) undecane]diethanol.

As the mold release agent, there can be exemplified an alcohol, an aliphatic acid, and an ester thereof, polyoxyalkylene glycol, an olefin compound having an average polymerization degree of 10 to 500, a silicone, and the like. Of these, an ester of ethylene glycol and a dialiphatic acid derived from a $C_{12}$-$C_{22}$ aliphatic acid is preferable; ethylene glycol distearate, ethylene glycol dipalmitate, and ethylene glycol diheptadecylate are particularly preferable.

Further, the reinforcing agent represented by an inorganic filler, a glass fiber, glass beads, a carbon fiber, and the like; an electrically conductive material represented by an electrically conductive carbon black, metallic powder, a fiber, and the like; thermoplastic resin represented by a polyolefin resin, an acrylic resin, a styrenic resin, a polycarbonate resin, an uncured epoxy resin, modified products thereof, and the like; a thermoplastic elastomer represented by a polyurethane type elastomer, a polyester type elastomer, a polystyrene type elastomer, a polyamide type elastomer, and the like, can be included. These are preferably included in an amount of 10 to 40 parts by mass based on 100 parts by mass of the polyacetal resin.

To the polyacetal resin composition, there can be included an inorganic pigment represented by zinc sulfide, titanium oxide, barium sulfate, titanium yellow, and cobalt blue; and an organic pigment represented by the types of condensed azo, perinone, phthalocyanine, and monoazo; and the like. The pigment of the present invention is used in an amount of 0 to 5 parts by mass, preferably 0.1 to 1 part by mass.

No limitation is particularly imposed on the method of producing the polyacetal resin composition of the present invention. In general, the polyacetal resin composition of the present invention can be obtained by mixing a polyacetal resin (A) and a hydrazide compound (B) and optionally the components (C) to (E) using Henschel mixer, tumbler, V-shaped blender, or the like, and then melt-kneading with a single or twin-screw extruder. It can be also obtained by, without preliminary mixing, continuously feeding each component to extruder either individually or in some lump of a few kinds. Further, it can be obtained by preparing, in advance, high concentrate master-batch comprising the components (A), (B), and optionally, (C) to (E), and diluting the master-batch with a polyacetal resin during the extrusion melt-kneading or upon injection molding.

No limitation is imposed on the method of molding the polyacetal resin composition of the present invention. Any of the well-known methods such as extrusion molding, injection molding, vacuum molding, blow molding, injection compression molding, decorated molding, molding with other materials, gas-assist molding, expansion injection molding, low pressure molding, injection molding of very thin article (extremely high injection velocity), composite-in-mold molding (insert molding, outsert molding), and the like can be used.

An article obtained by molding the polyacetal resin composition of the present invention under the usual conditions (molding pressure and injection velocity) at a temperature of 200° C. has advantageously succeeded in reducing an emission amount of formaldehyde, measured according to VDA275 method, to not more than 1 mg/kg, which has never been achieved before. Moreover, even in molding at a temperature of 240° C., which is a severe condition for polyacetal resin, the emission amount of formaldehyde, measured according to VDA275 method, does not exceed 3 mg/kg. Accordingly, the polyacetal resin composition of the present invention is applicable either to molding at a higher temperature or to molding wherein a resin temperature rises partially.

A molded article of the polyacetal resin composition includes a working part such as a gear, a cam, a slider, a lever, an arm, a clutch, a joint, an axis, a bearing, a key-stem, a key-top, a shutter, a reel, a part mating and sliding with a leading screw which drives a pick-up for an optical disc drive, a gear which rotates a leading screw, a rack gear which drives a pick-up, and a gear which mates with the rack gear and drives it; a resinous part by outsert molding; a resinous part by insert molding; a chassis; a tray; a side plate; and the like.

These parts can be used for various applications described below, because of its remarkably reduced emission amount of formaldehyde:

1. OA apparatuses represented by a printer and a copying machine;
2. cameras and video apparatuses represented by a VTR, a video movie, a digital video camera, a camera, and a digital camera;

3. apparatuses for music, image, or information represented by a cassette player, LD, DAT, MD, CD, DVD, other optical disc drives, MFD, MO, a navigation system, and a mobile personal computer;
4. telecommunication apparatuses represented by a cellular phone and a facsimile machine;
5. interior or exterior parts for an automobile such as fuel related parts represented by a gasoline tank, a fuel pump module, valves, and a gasoline tank flange, door related parts represented by a door lock, a door handle, a window regulator, and a speaker grille, seat belt related parts represented by a slip ring for a seat belt and a press bottom, parts for a combination switch, switches, and clips;
6. miscellaneous industrial goods represented by a disposable camera, a toy, a fastener, a chain, a conveyor, a buckle, sporting goods, a vending machine, furniture, an instrument, and an apparatus for house-building; and the like.

EXAMPLE

Hereinafter, the present invention is more specifically described referring to Examples and Comparative Examples but not limited thereto. The terms and measuring method used in the Examples and Comparative Examples are explained below.

(1) Melting Point of Polyacetal Resin (° C.)

Using a differential scanning calorimeter (DSC-2C, manufactured by Perkin-Elmer, Inc.), a sample was once heated up to 200° C. to melt and cooled down to 100° C. Then, the sample was again heated at a rate of 2.5° C./min, and a peak temperature of an exothermic spectrum generated during this step was defined as a melting point.

(2) Concentration of Residual Fluorine in Polyacetal Resin

After a polyacetal resin was hydrolyzed with 1N HCl, a fluorine concentration in the polyacetal resin was measured using a fluorine ionic electrode (manufactured by HORIBA, Ltd.).

(3) Amount of Formaldehyde Generated from Polyacetal Resin

A polyacetal resin (pellet) was heated and melted at a temperature of 200° C. for 50 minutes under flowing nitrogen (50 NL/hr). The formaldehyde gas generated from the polyacetal resin was absorbed into water. The amount of formaldehyde generated was measured by titration according to sodium sulfite method. Almost all the formaldehyde is generated by decomposition of unstable terminal groups of the polyacetal resin (—$OCH_2$)n-OH group).

(4) Amount of Formaldehyde Emitted from an Article

An article was molded by an injection molding machine (IS-80A manufactured by Toshiba Corp.) under the conditions: cylinder temperature: 200 or 240° C., injection pressure: 63.7 MPa (primary)/50.0 MPa (secondary), injection time: 15 seconds, cooling time: 20 seconds, and mold temperature: 77° C. The amount of formaldehyde emitted from the article was measured according to VDA275 method described below.

<VDA275 Method>

A test piece having a prescribed size (100 mm high, 40 mm wide, 3 mm thick) was set into a 1 L polyethylene vessel containing 50 mL of distilled water. The vessel was sealed and heated at 60° C. for 3 hours. The formaldehyde absorbed in the distilled water was reacted with acetyl acetone in the presence of ammonium ion. The amount of formaldehyde emitted (mg/kg) was determined by measuring the absorbing peak of the reaction product at a wavelength of 412 nm using a UV spectrometer.

(5) Long-Term Thermal Aging Resistance

A polyacetal resin article (3 mm thick) molded under the conditions described below was put in a gear oven of 140° C. for degradation. Degradation state of the article was evaluated by a period (days) taken until tensile strength of the article was decreased by 20% comparing to that just after molded.
Molding machine: SH-75 injection molding machine (manufactured by Sumitomo Metal Industries, Ltd.)
Cylinder temperature: 200° C.
Injection pressure: 54.0 MPa
Injection time: 25 seconds
Cooling time: 15 seconds
Mold temperature: 70° C.
Tensile strength was measured according to ASTM D638.
Components described below were used in each Example and Comparative Example.

(Polyacetal Resin a-1)

A twin-screw self-cleaning type polymerization reactor (L/D=8) equipped with a jacket capable of transferring a thermal medium was set at 80° C. To the reactor were fed trioxane at a rate of 4 kg/hr, 1,3-dioxolane (3.9 mol % based on 1 mol of trioxane) as a comonomer at a rate of 128.4 g/hr, and methylal ($0.7 \times 10^{-3}$ mol based on 1 mol of trioxane) as a chain transfer agent continuously. Further, a boron trifluoride di-n-butyl etherate ($1.5 \times 10^{-5}$ mol based on 1 mol of trioxane) as a polymerization catalyst was continuously fed to carry out polymerization. The polyacetal copolymer discharged from the reactor was fed into a 0.1% triethylamine solution to inactivate the polymerization catalyst. After the inactivated polyacetal copolymer was filtered using a centrifugal separator, a solution containing hydroxycholine formate (trimethyl-2-hydroxyethyl ammonium formate) was added as a quaternary ammonium compound in an amount of 1 part by mass based on 100 parts by mass of the filtered polyacetal copolymer, and they were mixed uniformly followed by drying at 120° C. The amount of hydroxycholine formate added was adjusted to 20 ppm by mass in terms of an amount of nitrogen by controlling the concentration of hydroxycholine formate in the solution containing hydroxycholine formate to be added. The dried polyacetal copolymer was fed into a twin-screw extruder equipped with a vent. Based on 100 parts by mass of the melted polyacetal copolymer in the extruder, 0.5 parts by mass of water was added to decompose and remove unstable terminal groups under the conditions of an extruder temperature of 200° C. and the retention time in the extruder of 7 minutes. The polyacetal copolymer with decomposed unstable terminal groups was devotatized under a vent vacuum degree of 20 Torr, and pelletized after being extruded from the dice part of the extruder as a strand. The obtained polyacetal resin a-1 had a melting point of 164.5° C., a fluorine concentration of 7.1 ppm and a generation amount of formaldehyde of 21 ppm.

(Polyacetal Resin a-2)

The polyacetal resin a-2 was obtained according to the same process as for the production of polyacetal resin a-1 except that 1,3-dioxolane was fed at a rate of 42.8 g/hr. The obtained polyacetal resin a-2 had a melting point of 169.5° C., a fluorine concentration of 7.3 ppm and a generation amount of formaldehyde of 52 ppm.

(Polyacetal Resin a-3)

The polyacetal resin a-3 was obtained according to the same process as for the production process of polyacetal resin a-1 except that the inactivated polyacetal copolymer was, dried at 120° C. without adding a quaternary ammonium compound after filtration using a centrifugal separator and fed into a twin-screw extruder equipped with a vent, and 3 parts by mass of water and 0.1 parts by mass of triethylamine as a basic compound were added based on 100 parts by mass of the melted polyacetal copolymer in the extruder. The obtained polyacetal resin a-3 had a melting point of 164.3° C., a fluorine concentration of 7.5 ppm and a generation amount of formaldehyde of 450 ppm.

(Hydrazide Compound)

b-1: sebacic di-hydrazide (manufactured by Japan Hydrazine Company, Inc.)

b-2: dodecanic di-hydrazide (manufactured by Japan Hydrazine Company, Inc.)

b-3: iso-phthalate di-hydrazide (manufactured by Japan Hydrazine Company, Inc.)

b-4: di-naphthalene acid di-hydrazide (manufactured by Japan Hydrazine Company, Inc.)

Examples 1 to 8

To 100 parts by mass of the polyacetal resin a-1 were incorporated 0.3 parts by mass of triethylene glycol-bis-[3-(3-t-butyl-5-methyl-4-hydroxyphenyl)-propionate] as an antioxidant, 0.15 parts by mass of calcium distearate as a catching agent of formic acid, 0.05 parts by mass of nylon 6,6 as a polymer containing formaldehyde reactive nitrogen, and a hydrazide compound shown in Table 1, and then the resultant mixture was fed into a twin-screw extruder equipped with a vent to obtain a polyacetal resin composition pellet. A specimen was obtained by molding pellets under the above-mentioned conditions and an amount of formaldehyde emitted therefrom and long-term thermal aging resistance were evaluated.

Examples 9 to 16

The same method as in Examples 1 to 6 was repeated except that the polyacetal resin a-2 was used to obtain a polyacetal resin composition pellet. A specimen was obtained by molding pellets under the above-mentioned conditions and an amount of formaldehyde emitted therefrom and long-term thermal aging resistance were evaluated.

Comparative Example 1

100 parts by mass of the polyacetal resin a-1, 0.3 parts by mass of triethylene glycol-bis-[3-(3-t-butyl-5-methyl-4-hydroxyphenyl)-propionate] as an antioxidant, 0.15 parts by mass of calcium distearate as a catching agent of formic acid, and 0.05 parts by mass of nylon 6,6 as a polymer containing formaldehyde reactive nitrogen were mixed and fed into a twin-screw extruder equipped with a vent to obtain a polyacetal resin composition pellet. A specimen was obtained by molding pellets under the above-mentioned conditions and an amount of formaldehyde emitted therefrom and thermal aging resistance were evaluated.

Comparative Example 2

The same method as in Comparative Example 1 was repeated except that the polyacetal resin a-2 was used to obtain a polyacetal resin composition pellet. A specimen was obtained by molding pellets under the above-mentioned conditions and an amount of formaldehyde emitted therefrom and long-term thermal aging resistance were evaluated.

Comparative Example 3

The same method as in Comparative Example 1 was repeated except that the polyacetal resin a-3 was used to obtain a polyacetal resin composition pellet. A specimen was obtained by molding pellets under the above-mentioned conditions and an amount of formaldehyde emitted therefrom and thermal aging resistance were evaluated.

Comparative Examples 4 to 7

To 100 parts by mass of the polyacetal resin a-3 were incorporated 0.3 parts by mass of triethylene glycol-bis-[3-(3-t-butyl-5-methyl-4-hydroxyphenyl)-propionate] as an antioxidant, 0.15 parts by mass of calcium distearate as a catching agent of formic acid, 0.05 parts by mass of nylon 6,6 as a polymer containing formaldehyde reactive nitrogen and a hydrazide compound shown in Table 1, and then the resultant mixture was fed into a twin-screw extruder equipped with a vent to obtain a polyacetal resin composition pellet. A specimen was obtained by molding pellets under the above-mentioned conditions and an amount of formaldehyde emitted therefrom and long-term thermal aging resistance were evaluated.

Comparative Example 8

A specimen was obtained by molding polyacetal copolymer TENAC C4520 (manufactured by Asahi Kasei Chemicals Corporation) under the above-mentioned molding conditions and an amount of formaldehyde emitted therefrom was measured. An amount of formaldehyde emitted from the article molded at a temperature of 200° C. and 240° C. was 2.0 mg/kg and 12.8 mg/kg, respectively.

[Table 1]

TABLE 1

| | (A) Polyacetal Resin | | | | | Emission | | | |
| | | Treatment agent for terminal groups | | | | | Amount of Formaldehyde (mg/kg) | | Long-Term |
| | | Melting point | | Amount (in terms of | Emission amount of formaldehyde | Part | (B) Hydrazide Compound | | Molding temperature | | Thermal Aging Resistance |
| | Kind | ° C. | Kind | nitrogen: ppm) | ppm | by mass | Kind | Part by mass | 200° C. | 240° C. | Day |
|---|---|---|---|---|---|---|---|---|---|---|---|
| Ex. 1 | a-1 | 164.5 | 1 (*1) | 20 | 21 | 100 | b-1 | 0.1 | 0.33 | 0.56 | 83 |
| Ex. 2 | a-1 | 164.5 | 1 | 20 | 21 | 100 | b-1 | 0.2 | 0.12 | 0.32 | 90 |
| Ex. 3 | a-1 | 164.5 | 1 | 20 | 21 | 100 | b-2 | 0.1 | 0.45 | 0.85 | 82 |
| Ex. 4 | a-1 | 164.5 | 1 | 20 | 21 | 100 | b-2 | 0.2 | 0.28 | 0.63 | 87 |

TABLE 1-continued

| | (A) Polyacetal Resin | | | | | | Emission | | | |
|---|---|---|---|---|---|---|---|---|---|---|
| | | | Treatment agent for terminal groups | | | | | Amount of Formaldehyde (mg/kg) | | Long-Term |
| | | Melting point | | Amount (in terms of | Emission amount of formaldehyde | Part | (B) Hydrazide Compound | | Molding temperature | | Thermal Aging Resistance |
| | Kind | ° C. | Kind | nitrogen: ppm) | ppm | by mass | Kind | Part by mass | 200° C. | 240° C. | Day |
| Ex. 5 | a-1 | 164.5 | 1 | 20 | 21 | 100 | b-3 | 0.1 | 0.4 | 0.74 | 82 |
| Ex. 6 | a-1 | 164.5 | 1 | 20 | 21 | 100 | b-3 | 0.2 | 0.22 | 0.53 | 86 |
| Ex. 7 | a-1 | 164.5 | 1 | 20 | 21 | 100 | b-4 | 0.1 | 0.52 | 0.88 | 80 |
| Ex. 8 | a-1 | 164.5 | 1 | 20 | 21 | 100 | b-4 | 0.2 | 0.3 | 0.65 | 85 |
| Ex. 9 | a-2 | 169.5 | 1 | 20 | 52 | 100 | b-1 | 0.1 | 0.54 | 0.98 | 76 |
| Ex. 10 | a-2 | 169.5 | 1 | 20 | 52 | 100 | b-1 | 0.2 | 0.23 | 0.65 | 81 |
| Ex. 11 | a-2 | 169.5 | 1 | 20 | 52 | 100 | b-2 | 0.1 | 0.75 | 1.32 | 76 |
| Ex. 12 | a-2 | 169.5 | 1 | 20 | 52 | 100 | b-2 | 0.2 | 0.41 | 0.95 | 80 |
| Ex. 13 | a-2 | 169.5 | 1 | 20 | 52 | 100 | b-3 | 0.1 | 0.66 | 1.21 | 75 |
| Ex. 14 | a-2 | 169.5 | 1 | 20 | 52 | 100 | b-3 | 0.2 | 0.35 | 0.78 | 80 |
| Ex. 15 | a-2 | 169.5 | 1 | 20 | 52 | 100 | b-4 | 0.1 | 0.8 | 1.49 | 72 |
| Ex. 16 | a-2 | 169.5 | 1 | 20 | 52 | 100 | b-4 | 0.2 | 0.45 | 1.05 | 78 |
| Comp. Ex. 1 | a-1 | 164.5 | 1 | 20 | 21 | 100 | — | — | 3.5 | 13.2 | 70 |
| Comp. Ex. 2 | a-2 | 169.5 | 1 | 20 | 52 | 100 | — | — | 4.2 | 20.3 | 62 |
| Comp. Ex. 3 | a-3 | 164.3 | 2 (*2) | 138.6 | 450 | 100 | — | — | 8.2 | 26.5 | 58 |
| Comp. Ex. 4 | a-3 | 164.3 | 2 | 138.6 | 450 | 100 | b-1 | 0.2 | 1.8 | 6.2 | 65 |
| Comp. Ex. 5 | a-3 | 164.3 | 2 | 138.6 | 450 | 100 | b-2 | 0.2 | 2.0 | 7.1 | 64 |
| Comp. Ex. 6 | a-3 | 164.3 | 2 | 138.6 | 450 | 100 | b-3 | 0.2 | 1.9 | 6.5 | 65 |
| Comp. Ex. 7 | a-3 | 164.3 | 2 | 138.6 | 450 | 100 | b-4 | 0.2 | 2.1 | 7.3 | 62 |

(*1) triethyl-2-hydroxyethyl ammonium formate
(*2) triethylamine

The present invention has been described in detail with reference to specific embodiments thereof. It will be apparent to one skilled in the art that various changes and modifications can be made therein without departing from the spirit and scope of this invention.

The present application is based on a Japanese patent application (Japanese Patent Application No. 2003-364175) filed on Oct. 24, 2003 and the content thereof is expressly incorporated herein by reference.

INDUSTRIAL APPLICABILITY

The polyacetal resin composition of the present invention has succeeded in reducing an amount of formaldehyde emitted from an article molded therefrom under the usual condition (molding pressure and injection velocity), measured according to VDA275 method (a standard for measuring an amount of formaldehyde emitted from an article) prescribed by German Automobile Manufacturers Association (Verband der Automobilindustrie), to not more than 1 mg/kg, which has not been achieved before. Moreover, the polyacetal resin composition of the present invention is applicable either to molding at a higher temperature or to molding wherein a resin temperature rises partially. Namely, various molding conditions can be applied. Furthermore, the polyacetal resin composition of the present invention has an excellent long-term thermal aging resistance.

As described above, the present invention provides a polyacetal resin composition which is remarkably reduced in an emission amount of formaldehyde and is rarely influenced by molding temperature dependency, and an article thereof having excellent long-term thermal aging resistance. The polyacetal resin composition and an article thereof are applicable to such a part that requires a reduced emission amount of formaldehyde, for example, molded parts used under the circumstance where VOC (volatile organic compound) emission controls have been promoted (specifically, automobile parts, housing parts, parts for home appliance and OA equipment, etc.), and they exhibit excellent performance and effects in such applications.

The invention claimed is:

1. A polyacetal resin composition comprising:
(A) 100 parts by mass of polyacetal resin having a generation amount of formaldehyde of not more than 100 ppm when heated at a temperature of 200° C. for 50 minutes under nitrogen atmosphere, and
(B) 0.01 to 5 parts by mass of a hydrazide compound, represented by the following formula (3):

$$H_2NNHCO-R^5-CONHNH_2 \qquad (3)$$

wherein $R^5$ represents a $C_2$-$C_{20}$ hydrocarbon,
wherein the polyacetal resin (A) is a polyacetal copolymer obtained through a heat treatment of unstable terminal groups as defined by the following:
the polyacetal copolymer is subjected to heat treatment in a molten state at a temperature in the range of from the melting point of said polyacetal copolymer to 260° C. in the presence of at least one quaternary ammonium compound represented by the formula (1) below:

$$[R^1R^2R^3R^4N^+]_n X^{-n} \qquad (1)$$

wherein each of $R^1$, $R^2$, $R^3$ and $R^4$ independently represents an unsubstituted or substituted $C_1$-$C_{30}$ alkyl group, a $C_6$-$C_{20}$ aryl group, an aralkyl group wherein an unsubstituted or substituted $C_1$-$C_{30}$ alkyl group is substituted with at least one $C_6$-$C_{20}$ aryl group, or an alkylaryl group wherein a $C_6$-$C_{20}$ aryl group is substituted with at least one unsubstituted or substituted $C_1$-$C_{30}$ alkyl group, wherein said unsubstituted or substituted alkyl group is linear, branched, or cyclic, and said substituted alkyl group has at least one substituent selected from the group consisting of a halogen atom, a hydroxyl group, an aldehyde group, a carboxyl group, an amino group, and an amide group, and wherein at least one hydrogen atom of each of said unsubstituted alkyl group, said aryl group, said aralkyl group, and said alkylaryl group is optionally replaced by a halogen atom; n represents an integer of from 1 to 3; and X represents a hydroxyl group, or an acid residue of a $C_1$-$C_{20}$ carboxylic acid, a hydroacid excluding a hydrogen halide, an oxoacid, an inorganic thioacid or a $C_1$-$C_{20}$ organic thioacid; in an amount of from 0.05 to 50 ppm by mass in terms of the amount of the nitrogen ascribed to the quaternary ammonium compound, based on the total mass of the polyacetal copolymer and the quaternary ammonium compound, wherein the amount of the nitrogen is represented by the formula (2) below:

$$P \times 14/Q \quad (2)$$

wherein P represents the amount (ppm by mass) of the quaternary ammonium compound, based on the total mass of the polyacetal copolymer and the quaternary ammonium compound, 14 is the atomic weight of nitrogen, and Q represents the molecular weight of the quaternary ammonium compound.

2. The polyacetal resin composition according to claim 1, wherein the polyacetal resin having the melting point of 155 to 171° C.

3. The polyacetal resin composition according to claim 1, wherein the polyacetal resin is a polyacetal copolymer polymerized using a complex compound of boron trifluoride and has a concentration of residual fluorine of not more than 13 ppm.

4. The polyacetal resin composition according to claim 1, wherein the hydrazide compound has a melting point of not lower than 160° C.

5. The polyacetal resin composition according to claim 1, wherein the hydrazide compound (B) is a sebacic di-hydrazide.

6. The polyacetal resin composition according to claim 1, which further comprises, based on 100 parts by mass of polyacetal resin, (C) 0.1 to 10 parts by mass of at least one selected from the group consisting of an antioxidant, a polymer or a compound containing formaldehyde reactive nitrogen, a catching agent of formic acid, a weathering stabilizer, and a mold release agent;

(D) 0 to 60 parts by mass of at least one selected from the group consisting of a reinforcing material, an electrically conductive material, a thermoplastic resin, and a thermoplastic elastomer; and (E) 0 to 5 parts by mass of a pigment.

7. The polyacetal resin composition according to claim 1, which, when formed into an article by molding at a temperature of 200° C., has an emission amount of formaldehyde, measured according to VDA275 method, of not more than 1 mg/kg.

8. The polyacetal resin composition according to claim 1, which, when formed into an article by molding at a temperature of 240° C., has an emission amount of formaldehyde, according to VDA275 method, of not more than 3 mg/kg.

9. An article obtained by molding of the polyacetal resin composition according to claim 1, wherein an emission amount of formaldehyde, measured according to VDA275 method, is not more than 1 mg/kg.

10. The polyacetal resin composition according to claim 1, wherein the hydrazide compound (B) is at least one selected from the group consisting of sebacic acid di-hydrazide, dodecanoic acid di-hydrazide, isophthalic acid di-hydrazide, and naphthalene 2,6-di-carboxylic acid di-hydrazide.

11. The polyacetal resin composition according to claim 1, wherein the polyacetal resin composition comprises, based on 100 parts by mass of the polyacetal resin, 0.03 to 3 parts by mass of the hydrazide compound (B).

12. The polyacetal resin composition according to claim 1, wherein the polyacetal resin composition comprises, based on 100 parts by mass of the polyacetal resin, 0.05 to 1 parts by mass of the hydrazide compound (B).

* * * * *